Patented July 2, 1940

2,206,643

UNITED STATES PATENT OFFICE 2,206,643

ORGANIC POLYSULPHIDE CEMENT AND PROCESS OF MAKING THE SAME

Joseph C. Patrick, Morrisville, Pa., assignor to Thiokol Corporation, Yardville, N. J., a corporation of Delaware No Drawing. Application August 14, 1937, Serial No. 159,150

6 Claims. (Cl. 260—29)

This invention relates to the production of cements, adhesives and the like, and is a continuation in part of my copending application Serial No. 753,122, filed November 15, 1934.

The preferred base material for preparing such cements is a polysulphide polymer or plastic which may be obtained by reaction of an alkaline polysulphide with a suitable organic body, or by other appropriate methods, e. g., oxidation of a polymercapto body.

First the production of the base material or polymer will be illustratively described and it is the manner of converting it into an adhesive or cement.

It is intended and will be understood that the invention will be defined by the claims ultimately appended hereto, properly interpreted, and that the purpose of the specification is to set forth typical or illustrative embodiments of the principles defined by the claims, these illustrations serving also as guide posts or markers to show the scope of the invention.

EXAMPLE 1.—*Preparation of polymer*

800 gallons of a 1.5 molar solution of sodium polysulphide corresponding to the tetrasulphide are placed in a reaction vessel provided with an agitator and coils for heating or cooling. To this solution is added a concentrated solution of NaOH made by dissolving 40 pounds of NaOH in 5 gallons of water. Next there is added, with agitation, a solution of 100 pounds of $MgCl_2.6H_2O$ dissolved in 10 gallons of water. Colloidal magnesium hydroxid is formed which acts as a dispersing agent for polymer subsequently formed.

The solution is heated to about 130° F. and then over a period of about 2 hours, 1500 pounds of BB′ dichlorethyl ether are added gradually, with continuous agitation. The temperature rises as a result of the reaction and is controlled so as not to exceed about 190–200° F.

A polymer is formed in dispersed condition and upon standing the polymer settles to the bottom of the vessel as a latex-like liquid. The supernatant liquid is syphoned off. The latex has the peculiar property of mixing readily with water and settling out therefrom on standing, a property which permits thorough washing.

The latex is agitated with water several times, settled after each agitation, and the supernatant liquid drawn off. By this means substantially all soluble byproducts and impurities including sodium chloride, etc., are removed.

The washed latex is drawn off into a coagulating tank provided with an air jet instead of a mechanical stirrer, and is made slightly acid, e. g., corresponding to a pH of about 3 by adding HCl. A coagulum in the form of a rubbery mass is formed. This is transferred to a rubber compounding mill and masticated on the rolls thereof until substantially dry. The polymer is then ready for conversion into cement. It amounts to about 1200 pounds.

In the above reaction the sodium tetrasulphide and ether are provided in substantially equal molecular proportions.

In that reaction, instead of sodium tetrasulphide, tetrasulphides or other polysulphides of alkali and alkaline earth metals and ammonium may be employed, and instead of BB′ dichlorethyl ether, other compounds may be used, as for example, the following:

$X.C_2H_4.O.C_2H_4.OC_2H_4X'$
disubstituted ethoxy ethyl ether
$X.CH_2.O.CH_2.X'$
disubstituted methyl ether
$X.C_2H_4.S.C_2H_4.X'$
disubstituted ethyl thio ether
$X.CH_2.S.C_2H_4.X'$
disubstituted ethyl methyl thio ether $$X.CH_2O.CH_2.\underset{\underset{CH_3}{|}}{\overset{\overset{CH_3}{|}}{C}}.CH_2.O.CH_2.X'$$

disubstituted 1,3 methoxy, 2-2 dimethyl propane
$X.CH_2.S.CH_2.X'$
disubstituted thio methyl ether.
$X.(CH_2)_3.O.CH_2.O.(CH_2)_3.X'$
disubstituted dipropyl formal
$X.(CH_2)_2.O.CH_2.O.(CH_2)_2.X'$
disubstituted diethyl formal $$X.CH_2O.CH_2.\underset{\underset{X'}{|}}{CH}.OCH_3$$

disubstituted 1,3 methoxy ethane

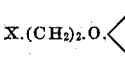

disubstituted para diethoxy benzene
$X.CH_2O.CH_2.CH_2.OCH_2.X'$
disubstituted 1,2 dimethoxy ethane
$X.(CH_2)_3.S.(CH_2)_3.X'$
disubstituted dipropyl thio ether
$X.(CH_2).SO_2.(CH_2)_2.X'$
disubstituted diethyl sulphone
$X.CH_2.CH=CH.CH_2.X'$
disubstituted butene 2,3

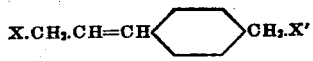
disubstituted 3-tolyl propene

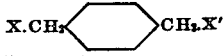
disubstituted para xylene

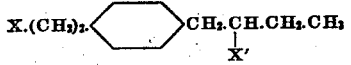
disubstituted para ethyl butyl benzene

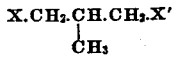
disubstituted iso butane

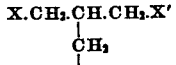
disubstituted iso pentane

The approximate proportion of sulphur in the polymers can be calculated and, of course, determined by analysis.

Thus the proportion of sulphur in the polymer of Example 1 is about 64 per cent, based upon the approximate formula:

$$[(C_2H_4)_2OS_4]_n$$

In the above formulae X and X' stand for a halogen atom or other replaceable substituent and it will be noted that in all cases the compounds have said substituent attached to different carbon atoms and, furthermore, that in many cases said carbon atoms are separated by structures having negative characteristics, e. g., ether or thio ether linkage, unsaturated carbon atoms and aryl or aralkyl nuclei. For the sake of convenience of reference, all the above listed compounds will be referred to herein as type B compounds.

Instead of such compounds, compounds illustrated by the following may be employed with, however, certain differences in results to be pointed out.

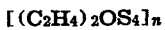

i. e., disubstituted straight chain aliphatic hydrocarbons. $n$ is a variable quantity, e. g. 1 to 20.

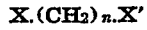
2,3 disubstituted butane

2,3 disubstituted propane

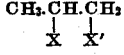
3,5 disubstituted heptane

Such compounds may, for convenience of reference, be referred to as type A compounds.

The replaceable substituent represented by X and X' may be a halogen, —SH group, formate, acetate, propionate, butyrate, sulphate, nitrate, oxalate, tartrate, citrate, benzoate, etc.

I will now describe the conversion of the coagulated polymer into a cement. Before doing so, I desire to point out that the polymer or coagulum upon being heated to suitable temperatures undergoes a curing reaction by which its mechanical strength, resistance to solvents and other desirable properties are greatly enhanced. After such curing, the difficulty of converting the polymer into a cement is greatly increased, particularly in the case of polymers made from type A compounds. In some cases it is, however, advantageous to prepare a cement from the cured polymer because after evaporation of the dispersing agent, further curing is unnecessary. Examples will be given of the preparation of cement or adhesive, both from uncured and cured polymers.

Some of the unique properties of the polymers of the present invention are their relative insolubility in ordinary solvents. This is true prior to curing as well as subsequent thereto. One of the problems solved by the present invention is to dissolve or disperse a substance which resists such attempts. From the commercial angle, it is not, however, enough in all cases merely to dissolve the polymer. Certain minimum concentrations, e. g., at least 3 to 5 pounds per gallon are frequently desirable. Another problem solved is, therefore, to attain such minimum concentrations and for this purpose it has been found desirable to employ a peptizing agent.

The invention includes not only the discovery of certain effective dispersing media but also agents (herein called peptizing agents) which make it possible to obtain large proportions of polymer dispersed in said media. The invention includes the further discovery that, once the polymer is dispersed in a suitable liquid medium, especially by the use of a peptizing agent, the resulting dispersion can then be diluted with solvents, which if used as dispersing media initially would be ineffective per se to produce the high concentrations mentioned, e. g., benzol, toluene, xylene.

EXAMPLE 2.—*Preparation of cement from uncured polymer*

500 pounds of polymer as produced in Example 1 above are compounded on a rubber mill with 50 pounds of zinc oxide and 2 pounds of tetramethyl thiuram disulphide. This mixture is then sheeted out as thin as possible, e. g., so that the sheet is about 1/8" to 1/4" thick. This is then placed in a suitable masticator, e. g., a Werner-Pfleiderer mixer having a pair of helical blades rotating in opposite directions and 1, 1-2 trichlorethane is added in small increments during about 6 hours with simultaneous mastication by the mixing blades. The quantity of trichlorethane used is sufficient to make 100 gallons, so that the final cement has 5 pounds of polymer per gallon of cement.

Instead of trichlorethane other dispersing media can be used, including the following:

Ethylene dibromide—$C_2H_4Br_2$
Ethylene dichloride—$C_2H_4Cl_2$
Tetrachlorethane—$C_2H_2Cl_4$
Chloroform—$CHCl_3$
Carbon disulphide—$CS_2$
Dichlorethylene—$C_2H_2Cl_2$
Trichlorethylene—$C_2HCl_3$
Tetrachlorethylene—$C_2Cl_4$ In general the chlorinated hydrocarbons are suitable but not all are equally effective. 1, 1-2 trichlorethane is the most effective so far known on polymers produced from type B compounds, in that its rate of dispersion is faster and higher concentrations of polymers can be obtained. It is also effective in combination with other dispersing agents and diluents. For example, a high concentration of polymer in 1, 1-2 trichlorethane can be produced (5 pounds per gallon of cement) and diluents added such as benzol, toluene, xylene and/or other and cheaper chlorinated solvents selected from the list above set forth.

It is frequently desirable to get the highest possible concentration of polymer and the tetramethyl thiuram disulphide, hereinafter referred to as "thiuram," mentioned in Example 2, is useful for that purpose. Without that it would be difficult even with 1, 1-2 trichlorethane to get a concentration as high as 5 pounds of polymer per gallon. The tetramethyl thiuram disulphide acts to increase the solubility of the polymer in the solvent by a peptizing action. Instead of "thiuram," hydrochloric acid may be used, e. g. by saturating the solution with dry HCl. Other substances that can be similarly used are ammonium chloride (e. g., 1% or less); substances yielding dry HCl, e. g., AlCl₃ and other unstable chlorides and acid chlorides; and diphenylguanidine. All such substances can be referred to as peptizing agents. Some (such as "thiuram" and diphenylguanidine) act not only as peptizing agents but also as acceleration of the curing of the polymer when the cement is subsequently used.

The function of the zinc oxide is to act as a curing agent. Instead of zinc oxide, other compounds can be used, particularly oxidizing agents, e. g.:

Lead oxides
Bismuth oxides
Arsenic oxides
Chromium oxides
Manganese oxides

In general oxidizing agents cause curing. In addition to the above, these oxidizing agents include organic peroxides, aryl and aralkyl nitro compounds.

In attempting to make cements from uncured polymers produced from type A compounds, carbon bisulphide is the most effective solvent. There is a distinct difference in the ease with which polymers from type A compounds and type B compounds can be dispersed. Example 2 relates to the production of dispersions from polymers produced from type B compounds. In using polymers from type A compounds, the procedure is similar except that carbon disulphide is used instead of the 1, 1-2 trichlorethane.

Although, as already stated, the uncured polymer presents problems in making adhesive therefrom, these problems are also present, a fortiori in making cements from the cured polymers because curing increases the resistance to dispersion. The present invention, however, has overcome these problems as illustrated by the following example.

EXAMPLE 3.—*Preparation of cement from cured polymer*

100 pounds of polymer produced as set forth in Example 1, are compounded on a rubber mill with 10 parts of zinc oxide, a peptizing agent, e. g., 0.2 pound of "thiuram," 60 pounds of carbon black and 0.5 pound stearic acid. The compound is sheeted out and cured in an open steam vulcanizer for 1 hour at about 300° F. (at about 50 pounds steam pressure). Then the steam pressure is released as rapidly as possible, whereupon the cured polymer is converted into a spongy material by expansion of gases therein.

It is then cut into small strips and placed in a mixer and heated therein (as set forth in Example 2) with 1, 1-2 trichlorethane, using a quantity sufficient to produce a concentration of 100 pounds of polymer in 30 gallons of cement, i. e., 3⅓ pounds per gallon.

EXAMPLE 4.—*Preparation of partially desulphurized polymer*

Proceed as in Example 1 up to the point where the latex is first settled out of the reaction mixture. Then add an agent which is capable of effecting a partial desulphurization, e. g., 250 pounds of NaOH and enough water to make a volume of 600 gallons. Heat to about 200° F. and stir for about 1 hour. The polymer is still in dispersed form due to the dispersing agent. Then add enough water to make up to a volume of 900 gallons and settle. Draw off the supernatant liquid. This contains sodium polysulphide due to reaction between the NaOH and the initial polymer. Then wash by stirring with fresh water and again settle out the latex. The latter contains the initial polymer in partially desulphurized form. It is then subjected to another stage in the partial desulphurization. For this purpose, add to the latex 250 pounds of flaked sodium monosulfide and enough water to make a volume of 600 gallons; heat to 190° F. for one hour with stirring. Then settle, draw off the supernatant liquid and wash the residual latex thoroughly by repeated agitation with water and settling. This latex contains the polymer in partially desulphurized form, containing about 47 per cent sulphur as compared with about 64 per cent sulphur in the initial polymer. The latex is then coagulated and dehydrated as in Example 1.

The initial coagulated polymer comprises a long chain of radicals resulting from the polymerization of the reaction products of the alkaline polysulphide and the disubstituted organic compound, thus:

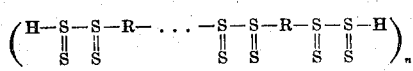

The tetrasulphide group has replaced the replaceable substituent of the organic compound. Upon curing with an oxidizing agent, condensation of the above complex occurs.

The above tetrasulphide polymer can be partially desulphurized to produce a disulphide polymer, thus:

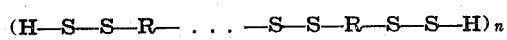

Such partial desulphurization can be effected as in Example 4.

The disulphide polymers possess well defined advantages over the tetrasulphide polymers but these advantages also present problems in producing cements therefrom. Such polymers are more reactive, i. e., they cure more readily than the tetrasulphide polymers and produce cured products having distinctly greater resiliency strength, resistance to ordinary solvents and stability toward deteriorating influences such as sunlight and oxygen.

But in view of this reactivity, a peptizing agent must be found which (if it is also a curing accelerator) will not cure so fast that the cement (containing said agent and polymer) will spontaneously cure on standing and storage.

The preparation of a cement from a partially desulphurized (i. e., disulphide) polymer is illustrated by the following example:

EXAMPLE 5.—*Preparation of cement from partially desulphurized uncured polymer*

Proceed as in Example 2. The partially desulphurized polymer cures, however, more rapidly than its mother substance and for many purposes its combination with the highly active "thiuram" would produce a cement too susceptible to cure at ordinary temperatures. Therefore, a peptizing agent which is more sluggish as a curing accelerator is desirable, e. g., oxidized mercaptobenzothiazole.

In many cases the cements of my invention are used in such manner that the polymer contained therein is subjected to curing after evaporation of the solvent, and in this connection the cement produced from partially desulphurized uncured polymers has the advantage of producing (by curing of the residue after evaporation of the solvent) films, etc., having increased mechanical strength, resistance to abrasion, resistance to ordinary solvents such as gasoline, oils, alcohols, ethers, etc.

Disulphide polymers produced as in Example 4 can be cured and the cured polymer dispersed by proceeding as in Example 3. Such cured polymers are, however, very resistant to conversion into cements, much more so than cured tetrasulphide or higher polysulphide polymers.

In addition to sulphurized polymers obtained as previously described, other sulphurized polymers can be used according to this invention, e. g., polymers obtained from polymercapto compounds.

EXAMPLE 6.—*Production of polymer by oxidation of mercapto compounds*

138 grams or 1 mol of dimercapto ethyl ether
$HS.C_2H_4.O.C_2H_4.SH$
are dissolved in a liter of sodium hydroxide solution containing 90 grams of NaOH; that is, an amount of NaOH slightly in excess of 2 mols. With this solution there is intimately mixed a freshly prepared suspension of magnesium hydroxide made by treating 10 grams of $MgCl_2.6H_2O$ with 50 cc. of water and adding thereto a solution of 4 grams NaOH dissolved in 10 cc. of water. The entire mixture is then placed in a reaction vessel provided with stirring means and also means for heating, for example, steam coils. The mixture is subjected to stirring and to this is gradually added a solution of sodium polysulphide made, for example, by dissolving 348 grams or 2 mols of sodium tetrasulphide in one liter of water during a period of about ten minutes. The reaction occurs approximately at room temperature and is somewhat exothermic. The reaction is substantially completed after all the polysulphide has been added. The completion of the reaction is indicated by withdrawing a sample, acidifying it and observing whether the odor of mercaptan is absent. Stirring may be continued until the reaction is completed as indicated by this test.

The polysulphide acts as an oxidizing agent and converts the dimercapto ethyl ether into a complex polymer or plastic. The advantage of the magnesium hydroxide is that the said polymer or plastic is produced in the form of a latex-like liquid which has the unique property of being capable of intimate mixture with water and settling out subsequently as by the action of gravity. This property permits intimate and thorough washing to remove soluble impurities. Acidification of the latex-like liquid causes the separation of polymer as an agglomerated mass, the removal of the impurities from which would be a difficult problem. It is, therefore, highly desirable to accomplish the washing while this mass is in dispersed form, inasmuch as under such conditions the high degree of dispersion of the polymer permits an extremely thorough removal of the soluble impurities by washing.

The difficulty of transporting the latex in agglomerated form, and the ease with which it sticks to parts of apparatus, such as the stirrer, also makes it advisable to produce the polymer in the reaction vessel in its dispersed latex-like form, from which vessel it can be readily removed because of its liquid-like characteristics.

Washing of the polymer in its dispersed condition may be accomplished in the reaction vessel by stirring it up with successive quantities of water, settling and drawing off the supernatant wash liquid. The washing can, of course, be accomplished in a different vessel. In any event, it is desirable to preserve the polymer in its dispersed condition until after removal from the reaction vessel.

The washed latex is then transferred to a second vessel where coagulation or agglomeration is produced by acidification. Sufficient acid may be added for this purpose until the mother liquid is acid to methyl orange or brought to a pH of about 3. The coagulated polymer is then dehydrated by any suitable method, e. g., milling, mastication, kneading. In such processes, considerable heat is involved which, together with the mechanical action, causes the removal of water.

In the above example, instead of sodium hydroxide as the agent for dissolving the dimercapto compound, other alkaline hydroxides could be used, for example potassium, ammonium, lithium, calcium, barium, strontium, and in general any other alkaline materials which will not form an insoluble sulphide. Instead of sodium polysulphides, other polysulphides may be employed and other oxidizing agents, for example oxygen, air, ozone, hypohalites, and in general any oxidizing agent effected in an alkaline solution, for example, hydrogen peroxides and metal hydroxides, perborates, chromates, dichromates, manganates and permanganates, etc.

Instead of magnesium hydroxide, other gelatinous hydroxides may be employed, for example, aluminum hydroxide, chromium hydroxide, ferric hydroxide. Moreover, dispersing agents other than hydroxides may be employed, for example, gelatin, albumen, casein, etc. These alternative dispersing agents can also be used in Example 1 instead of $Mg(OH)_2$.

Instead of BB′ dimercapto ethyl ether, other compounds can be used, e. g., all of the compounds hereinabove listed where X and X′ is an —SH group, respectively. The compounds thus produced are disulphide polymers having the general formula:

and are, in general, similar to compounds produced by partially desulphurizing the tetra and polysulphide polymers.

EXAMPLE 7.—*Preparation of cement from oxidized mercapto bodies*

Proceed as in Example 5.

The invention includes the discovery that the peptizing and dispersing steps are distinct although they may occur concurrently. Instead of treating the polymer simultaneously with a peptizing agent and a dispersing medium, the polymer can first be subjected to any treatment which would increase its solubility or dispersability and then be masticated with the dispersing medium. The invention, therefore, includes the provision of a peptized polymer and the treatment of the peptized polymer with a dispersing medium. For example, the polymer can be masticated on rubber compounding rolls so as to peptize it, e. g., by adding a peptizing agent such as tetramethyl thiuram disulfide during treatment on the rolls and the peptized polymer can then be treated with a suitable dispersing medium such as 1, 1-2 trichlorethane.

The preferred base materials of the adhesive of the present invention are organic polysulphide polymers. Those produced by reaction between organic bodies having replaceable substituents (i. e. substituents split off during the reaction) on different carbon atoms and alkaline tetrasulphides or higher polysulphides are organic tetrasulphides or higher organic polysulphides. The organic disulphides can be produced by oxidizing mercapto bodies having an —SH group on each of two different carbon atoms or by partially desulphurizing the organic tetra- or polysulphide polymers.

The organic di- and tetrasulphides are species of the organic polysulphides.

The disulphide polymers contain about 10 to about 75 per cent of combined sulphur. The tetrasulphide polymers contain about 20 to about 85 per cent of combined sulphur.

It has been found that the material of this invention can be applied to surfaces or objects in any suitable manner in which such a plastic or liquid may be employed or manipulated. For example, the stiffer "doughs" can be applied by a spreading device or apparatus and the more fluid types can be applied by brush or by a suitable modification of a spray gun, such as are used in applying lacquers and paints.

This invention is suitable for the preparation of impregnated or coated textile materials, such as woven cloth, felted cloth, woven or felted asbestos, woods, wood flour and wood fibres, such as wall board, etc. The very high electric insulative values of the films so prepared in many cases enables them to be used on conductors instead of tape or other insulative material. In this use the very high extensibility and elasticity of the sulphurized plastic, together with its extreme stability against oxidation and resistance to most solvents, renders it peculiarly suitable.

Layers of this material can be sheeted on glass to which it has a very high degree of adherence and after removal of the dispersing agent by evaporation or otherwise, another sheet of glass can be pressed upon the film giving a sandwich-like effect, which, due to the highly adhesive and other characteristics of the plastic film, renders the glass much more resistant to shattering than any of the other materials known, and the high transparency of this material in thin films renders it especially suitable for this use.

The dispersions above described are also extremely well adapted for being applied to the surface of metals and other corrodible materials for their protection. Tests of electric condensers made by applying layers of the dispersed material to aluminum and tin sheets, have proven that such condensers are extremely satisfactory as they withstand rough treatment and are highly efficient. Among the surfaces which may be coated with this material rubber surfaces are quite important, as the material is highly resistant to many gases and liquids that attack rubber and, therefore, it protects the rubber against the injurious effects of such gases and liquids due to the fact that the coatings are adherent to rubber and form continuous layers, free from holes, which are flexible and elastic so that they stretch with the rubber and do not crack when the rubber is bent.

Paper has been coated in some cases and in others the paper has been impregnated with the dispersed plastic and it has been found that receptacles or containers made from such coated or impregnated material can be used for long periods of time for the storage of gasoline, oils, and many other solvents and that substances such as milk, which contains a considerable amount of fatty material, can be stored and retained in receptacles made from this material.

What I claim is:

1. A liquid composition comprising a polymeric body substantially identical with that obtained by reacting an alkaline polysulphide with an organic compound having two carbon atoms to each of which is attached a substituent split off during the reaction; a volatile halogenated organic solvent and a substance selected from the group consisting of tetramethyl thiuram disulphide and oxidized mercaptobenzothiozol, said substance being capable of producing a dispersion of the polymer in the solvent having a concentration of the order of 3 to 5 pounds per gallon.

2. A liquid composition comprising a polymeric body substantially identical with that obtained by reacting an alkaline polysulphide with an organic compound having two carbon atoms to each of which is attached a substituent which is split off during the reaction, said carbon atoms being joined to and separated by structure characterized by an ether linkage; a volatile halogenated organic solvent and a substance selected from the group consisting of tetramethyl thiuram disulphide and oxidized mercaptobenzothiozol, said substance being capable of producing a dispersion of the polymer in the solvent having a concentration of the order of 3 to 5 pounds of polymer per gallon.

3. A liquid composition comprising a polymeric body substantially identical with that obtained by reacting an alkaline polysulphide with an organic compound having two carbon atoms to each of which is attached a substituent which is split off during the reaction whereby a polymer is obtained and partially desulphurizing said polymer; a volatile halogenated organic solvent and a substance selected from the group consisting of tetramethylthiuram disulphide and oxidized mercaptobenzothiozol, said substance being capable of producing a dispersion of the polymer in the solvent having a concentration of the order of 3 to 5 pounds of said polymer per gallon.

4. A liquid composition comprising a polymeric body substantially identical with that obtained by reacting an alkaline polysulphide with an organic compound having two carbon atoms to each of which is attached a substituent which is split off during the reaction, said carbon atoms being joined to and separated by structure characterized by an ether linkage, whereby a polymer is obtained and partially desulphurizing said polymer; a volatile halogenated organic solvent and a substance selected from the group consisting of tetramethylthiuram disulphide and oxidized mercaptobenzothiozol, said substance being capable of producing a dispersion of the polymer in the solvent having a concentration of the order of 3 to 5 pounds of said polymer per gallon.

5. A liquid composition comprising a polymeric body substantially identical with that obtained by reacting BB' dichloroethylether with an alkaline polysulphide; a volatile halogenated organic solvent and a substance selected from the group consisting of tetramethylthiuram disulphide and oxidized mercaptobenzothiozol, said substance being capable of producing a dispersion of the polymer with solvent having a concentration of the order of 3 to 5 pounds of said polymer per gallon.

6. A liquid composition comprising a polymeric body substantially identical with that obtained by reacting BB' dichloroethylether with an alkaline polysulphide and partially desulphurizing the resulting polymer; a volatile halogenated organic solvent and a substance selected from the group consisting of tetramethylthiuram disulphide and oxidized mercaptobenzothiozol, said substance being capable of producing a dispersion of the polymer with solvent having a concentration of the order of 3 to 5 pounds of said polymer per gallon.

JOSEPH C. PATRICK.